No. 877,217.
PATENTED JAN. 21, 1908.
R. L. MORGAN.
WHEEL RIM FASTENER.
APPLICATION FILED JAN. 12, 1907.
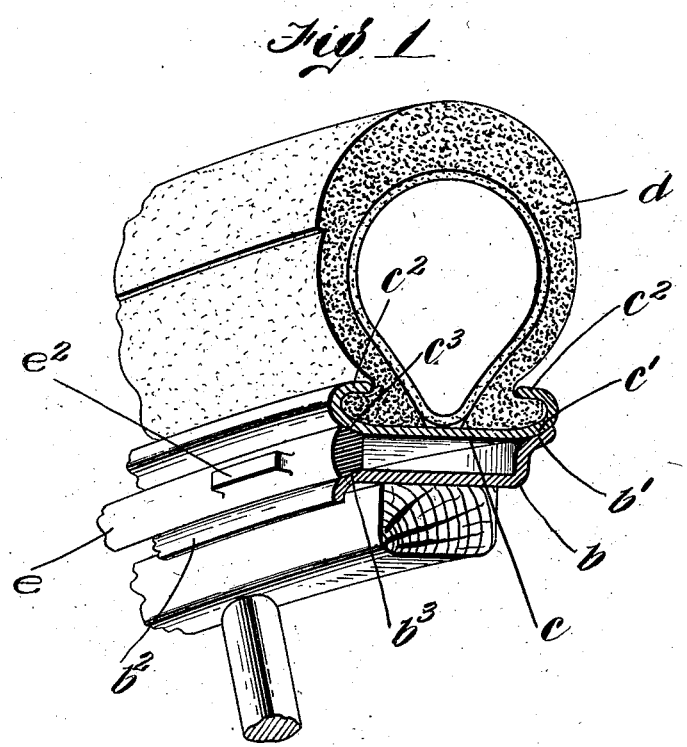
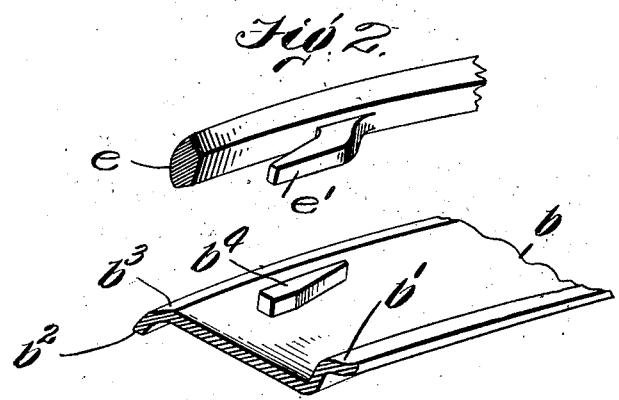
Witnesses:
Inventor:
R. L. Morgan
By Attorneys
Southgate & Southgate

UNITED STATES PATENT OFFICE.

RALPH L. MORGAN, OF WORCESTER, MASSACHUSETTS.

WHEEL-RIM FASTENER.

No. 877,217.  Specification of Letters Patent.  Patented Jan. 21, 1908.

Application filed January 12, 1907. Serial No. 351,956.

*To all whom it may concern:*

Be it known that I, RALPH L. MORGAN, a citizen of the United States, residing at Worcester, in the county of Worcester and State of Massachusetts, have invented a new and useful Wheel-Rim Fastener, of which the following is a specification.

This invention relates to that class of wheels in which a detachable rim is placed on the rim mounted on the felly, said detachable rim having inwardly turned side flanges or the like for holding a clencher tire, the tire and detachable rim being removable together as a whole.

The principal objects of the invention are to provide for securely fastening the detachable rim in place in such manner that there will be no detachable small parts and no bolts will have to be passed through or into the felly for this purpose, thereby avoiding the weakening of the felly by the bolt holes and especially avoiding the necessity of unscrewing or otherwise detaching any removable holding device or devices when the removable rim is to be taken off; also to provide a simple and convenient fastening device which will hold the parts securely in position and will require no adjustment of separable holding or fastening means in order to remove the rim, and which will hold securely even if the parts should become deranged in use, furthermore to provide a very simple means in the form of a continuous unsplit ring for securing the clamping action directly between the fixed rim and the detachable rim.

Further objects and advantages of the invention will appear hereinafter.

Reference is to be had to the accompanying sheet of drawings in which,

Figure 1 represents a perspective sectional view of a portion of a wheel tire exhibiting a preferred embodiment of this invention. Fig. 2 is a fragmentary perspective view showing a preferred form of clamping or locking ring therefor, and Fig. 3 is a view similar to Fig. 2 showing a part of the fixed rim.

The invention is carried out by so locating a fastening ring that it will bear on adjacent but oppositely facing surfaces on the fixed and detachable rims.

The invention is shown as applied to a wheel in which the felly is provided with a rim $b$ which is preferably fixed in any desired way. This rim is provided with a surface $b'$ which preferably is slanting so that the detachable rim $c$ which is provided with a corresponding surface $c'$ can be wedged thereon. The detachable rim $c$ is provided with a pair of inwardly turned side flanges $c^2$ preferably fixed or integral with respect thereto for the purpose of holding a clencher tire $d$ of any desired character.

The rim $c$ with the tire thereon is intended to be placed on the rim $b$ by forcing it over the same the surfaces $b'$ and $c'$ coming into contact with each other.

For the purpose of bringing the removable rim $c$ to proper position and securely clamping it in place in such a manner as to secure the above mentioned results, the rim $b$ according to this invention is provided with a flange $b^2$ which is preferably integral with the rim. This flange projects inwardly toward the center of the wheel from the rim $b$ and may be spaced at some little distance from the edge of the felly. It has a slanting outer surface $b^3$ for the purpose of affording a wedging action as will be described. The detachable rim $c$ has an oppositely slanting surface $c^3$. A circular fastening rim $e$ is provided for the purpose of engaging the surfaces $b^3$ and $c^3$ and means is provided for drawing the ring inwardly to force these surfaces apart and clamp the rims together when the ring is turned in one direction. The ring $e$ is of wedge-shaped form in cross section, and forms a complete circle. It is provided with clamping means shown in the form of a series of wedge shaped lugs $e'$ adapted to engage lugs $b^4$ shown on the fixed rim. The ring is placed in position with the lugs engaging each other and turned on its axis in any desired way, as for example by striking lugs $e^2$ with a hammer or the like. This securely locks the detachable rim $c$ directly to the fixed rim $b$, and it will be seen that it does away with all detachable fastening devices, such as bolts, whereby the above mentioned results are obtained.

The ring can readily be unlocked without manipulation of a single holding or fastening device merely by striking the lugs $e^2$ in the other direction. The operation of placing the ring in place and forcing it to a position in which it will securely hold the rims together, will be obvious. By the use of a fastening ring, any derangement which may be caused by the yielding, or even bending, of the flange $b^2$ or by wear, is compensated for in tightening up the ring.

It will be seen that by the construction of a wheel in accordance with the principle of this invention, whether in the exact form illustrated or otherwise, the detachable rim can be most quickly clamped in position on the wheel, with any desired amount of wedging action, and when it is desired to dismount it, it can as readily be detached without the necessity of unfastening any fastening devices except the ring itself. Moreover, the clamping action is secured in a simple and inexpensive manner without modifying the felly of the wheel in any way, and without weakening the same by making bolt holes therethrough, and there are no detachable small parts that can be lost or broken.

The modification in the construction of the fixed rim $b$ is of such a simple character that it does not materially add to the expense of this part of the device.

While I have illustrated and described one form in which the invention can be embodied, I am aware that modifications may be made therein, both in the fastening ring itself, and in the means for holding the same as well as the other parts of the device, without departing from the spirit of the invention as expressed in the claims. Therefore I do not wish to be limited to the particular construction of features shown, but What I do claim and desire to secure by Letters Patent is:—

1. The combination with an inner wheel rim having an elevated bearing surface, of an outer rim bearing near one side on said elevated surface, and a fastening device supporting the other side of the outer rim from the inner rim, said inner rim having means located between the rims and entirely at one side thereof for clamping the fastening device thereto.

2. The combination with a wheel rim having a bearing surface near one side and a flange near the other, of a detachable rim adapted to rest at one edge on said bearing surface, and a wedge-shaped endless fastening ring located between the opposite side of the detachable rim and the flange on the first named rim for supporting the detachable rim and holding the rims together, said first named rim having means adjacent to the flange and between the two rims for holding the fastening ring in place.

3. The combination with a fixed wheel rim of a detachable wheel rim adapted to be supported at one side by the fixed wheel rim, an endless wedge-shaped fastening ring adapted to enter a space between the rims and support one from the other, said fixed rim having a series of wedge-shaped lugs on its outer surface and said ring having corresponding inwardly extending wedge-shaped lugs adapted to engage the first named lugs to hold the ring in position, whereby the ring will conceal the lugs.

4. In a fastening device for a wheel rim, an endless ring wedge-shaped in cross-section, with the narrow edge of the wedge extending substantially perpendicular to the plane of the wheel, said ring having fastening devices on the inner surface thereof, adapted to be entirely concealed and protected by the ring when in position, and being provided with lugs on the opposite outer surface for receiving blows for forcing the same into fastening position.

In testimony whereof I have hereunto set my hand, in the presence of two subscribing witnesses.

RALPH L. MORGAN.

Witnesses:
ALBERT E. FAY,
LOUIS W. SOUTHGATE.